United States Patent [19]

Rouse et al.

[11] Patent Number: 4,714,201
[45] Date of Patent: Dec. 22, 1987

[54] TIRE PROCESSING APPARATUS AND METHOD

[75] Inventors: Michael W. Rouse, West Linn; Robert L. Thelen, Woodburn; John Morison, Gresham, all of Oreg.

[73] Assignee: Waste Recovery, Inc., Portland, Oreg.

[21] Appl. No.: 923,110

[22] Filed: Oct. 24, 1986

[51] Int. Cl.$^4$ ................. B02L 23/12; B02L 23/14
[52] U.S. Cl. ................................ 241/24; 241/27; 241/29; 241/DIG. 31
[58] Field of Search ............. 241/24, 27, 29, 34, 241/35, 36, 76, 78, 79, 80, 152 R, 152 A, 159, 235, 236, DIG. 31

[56] References Cited

U.S. PATENT DOCUMENTS

| | | | |
|---|---|---|---|
| 3,923,256 | 12/1975 | Dorner | 241/DIG. 31 X |
| 3,931,935 | 1/1976 | Holman | 241/24 |
| 3,997,121 | 12/1976 | Motell | 241/DIG. 31 X |
| 4,156,508 | 5/1979 | Kisielewski | 241/80 |
| 4,374,573 | 2/1983 | Rouse et al. | 241/101.7 |
| 4,560,112 | 12/1985 | Rouse et al. | 241/236 |

Primary Examiner—Timothy V. Eley
Attorney, Agent, or Firm—Chernoff, Vilhauer, McClung & Stenzel

[57] ABSTRACT

Apparatus and a method for its use for reducing discarded pneumatic tires and other large articles of tough, resilient, material into pieces of greatly reduced size, including a series of machines which successively shear and granulate tough, resilient articles into smaller and smaller pieces. In one embodiment of the apparatus according to the invention two successive rotary shear machines are followed by a granulator. Pieces are sorted before being sent to the granulator, and oversize pieces are sent a second time through the two shears. In another embodiment of the invention a single rotary shear apparatus is followed by a pair of granulators which successively reduce the size of pieces of material to smaller and smaller sizes. Materials are fed to the rotary shears and granulators by conveyors whose speeds are controlled by varying the frequency of alternating current electric power supplied to electric motors driving the conveyors, with the frequency being controlled in response to sensing the load imposed on the shears and granulators, so that the shears and granulators are operated at or near their maximum capacity.

8 Claims, 8 Drawing Figures

TIRE PROCESSING APPARATUS AND METHOD

BACKGROUND OF THE INVENTION

The present invention relates to treatment of waste pneumatic tires and similar tough, resilient materials, and particularly relates to a method and apparatus for reducing scrap tires into pieces which are small enough to be handled and transported easily and to be useful for further processing.

Huge numbers of unusable pneumatic tire carcasses are discarded annually. These tire carcasses contain quantities of synthetic and natural rubber material which is useful for many different purposes, except for the fact that the bulkiness of tires has made it uneconomical in the past to recover the materials of which they are made. Many different machines have been made which are able to reduce whole tires into smaller pieces of various sizes, at various rates, and with different amounts of reliability. Some of these machines are able to cut whole tires into smaller pieces at a high rate, but the pieces produced may still be too large for many applications. Examples of such machines are those of the type disclosed in Holman, U.S. Pat. No. 3,931,935, Rouse et al., U.S. Pat. No. 4,374,573, and Rouse et al., U.S. Pat. No. 4,560,112. These machines are capable of reducing whole automobile and truck tires into smaller pieces, most of which are elongate strips, with a single pass through the machine.

Kisielewski, U.S. Pat. No. 4,156,508 suggests passing the larger ones of those pieces a second time through the same shredder in order to reduce the pieces to a smaller size. This method, however, reduces the number of tires which can be shredded by the machines in a given amount of time.

Plastics granulator machines which have been known previously are also useful in reducing pieces of rubber to smaller sizes. One such machine which has proven useful for pieces of rubber tires is the Model 3250 granulator manufactured by Cumberland Engineering, a Division of Leesona Corporation, of Attleboro, Mass. It includes stationary horizontal knives, and several short blades attached to a hub which rotates rapidly about a horizontal axis to reduce pieces of material including tough resilient material such as tire rubber into smaller pieces by shearing or crushing the material between the short blades and the horizontal knives. A screen surrounding the rotating knives retains pieces of material which have been fed into the apparatus, until they have been reduced to an acceptably small size and are able to escape by passing through the screen. Apparatus of this type is unable to handle large pieces of rubber such as whole tires efficiently, but has been used in the past to reduce to an acceptable size the pieces which have been produced by cutting apart whole tires. Such granulators operate with rubber most efficiently if fed smaller pieces of rubber at a steady rate and if the reduction in size required in the granulator is not too great.

Pneumatic tire casings often contain metal wires, both as tread reinforcements and in the bead portions of the tires. Such reinforcing materials interfere with some uses of the pieces of rubber which can be produced by cutting tires, but are themselves of value when reclaimed.

Feeding whole tires into shredding apparatus is frequently subject to short interruptions and often produces an output of shredded tires which is not completely steady. Occasionally, such apparatus becomes temporarily overloaded and must be stopped and cleared before disposal of such whole tires can be continued. Preferably, this should not interfere with the rate of production of small pieces of material.

None of the previously-known apparatus or methods, however, have provided adequately for reducing entire automobile and truck tires and similar tough, resilient objects and materials into small pieces, having maximum dimensions on the order of one inch or less, which are easily transported and useful for chemical treatment or further mechanical treatment and subsequent reuse of the materials or components thereof.

What is needed, then, is apparatus and a method for its use for reducing relatively large pieces of tough resilient materials, such as vehicle tires, into small pieces at a high rate and a steady output which is not dependent on providing a completely continuous flow of whole tires into the apparatus.

SUMMARY OF THE INVENTION

The present invention overcomes some of the shortcomings and disadvantages of the previously available apparatus and methods for reducing large pieces of tough resilient material into much smaller pieces, by providing an interrelated system of shredders and granulators, capable of reducing large pieces of tough resilient materials, such as whole passenger automobile and truck tire carcasses, into elongate shreds having widths on the order of two or three inches, and thereafter reducing those pieces successivly into smaller and smaller pieces in additional machines, while controlling the machines according to the method of the invention so as to maximize the number of tires which can be reduced thus to pieces of a desired smaller size.

In a first preferred embodiment of the invention, whole tires or similar large pieces of tough resilient material are fed by conveyor into a first shredder, preferably a rotary shear of the type including a pair of counter-rotating cylindrical cutter rolls having intermeshed cutter disks provided with sharp edges which shear each tire into strips whose widths are related to the thicknesses of the intermeshed cutter disks. The shreds produced by the first shredder are then conveyed to a second shredder of similar construction, but which may include cutter disks which are thinner, in which the shreds are cut into smaller pieces. The pieces of material thus produced are then sorted, and pieces which have been reduced to a predetermined size or smaller are transported to a temporary storage location. Larger pieces which have been sorted out are again fed through the two shredding machines until they have been sufficiently reduced in size.

Pieces which have been reduced to the desired size in the two shredders are taken from the temporary storage location and delivered at a controlled rate to a granulator of the type including horizontal fixed blades and rotary blades which interact with the fixed blades to reduce the size of pieces until they are small enough to pass through a retaining screen. The amount of power required by the granulator is monitored and the rate of delivery of pieces of material to the granulator is controlled in response to the amount of power being utilized by the granulator in order to operate the granulator near its maximum rate of production. Preferably, the granulator is driven by electricity and the electrical load drawn by the granulator motor is monitored and used to control the output frequency of a variable-frequency power supply which powers a metering device and a conveyor which feeds material to the granulator in response to the load on the granulator, to keep the load on the granulator within predetermined limits.

Similarly, the conveyor used to feed whole tires to the first shredder may be controlled in response to observation of the power utilized at any particular time by the shredder, so that the shredders and the granulator both operate at or near their maximum capacities.

In another embodiment of the invention, a single shredder is used, and material which has been shredded once is fed directly to a first granulator which reduces the size of pieces to a predetermined intermediate size, with the rate of delivery of tires to the first granulator optionally being controlled in response to the load experienced by the first granulator. Materials which have passed through the first granulator are stored temporarily and then fed to a second granulator at a rate controlled in response to the load experienced by the second granulator in the manner explained in connection with the first embodiment of the invention.

In both the first and second embodiments of the apparatus of the invention, magnetic material is removed from the pieces of material which have been shredded and granulated. A first magnetic separation removes loose magnetic material, using a self-cleaning magnet to lift it upward from a conveyor carrying material away from the granulator. A second phase of magnetic material removal is effected by passing the granulated material over a self-cleaning magnet of the type including a rotating drum inside which is located a magnet, with the magnetic material adhering to the outside of the drum, while the non-magnetic resilient material falls away from the drum. The magnetic material is then allowed to fall away from the drum at a location beyond the extent of the magnet located within the drum.

Accordingly, it is a principal object of the present invention to provide improved apparatus and a method for rapidly and efficiently reducing large quantities of bulky articles of tough, resilient material, such as discarded pneumatic tire casings, into small pieces which can be used as fuel for combustion or raw materials for chemical or mechanical reclamation of the content of the articles.

It is another object of the present invention to provide apparatus and a method for its operation which will assure use of the apparatus at a maximum capacity.

It is an important feature of the present invention that it teaches operating shredder and granulator machines and feeding material into shredder and granulator machines at a rate controlled according to the loading experienced by the machines in order to process a maximum amount of material.

It is a principal advantage of the present invention that it provides apparatus and a method for its operation which permit reduction of tough resilient articles such as reinforced vehicle tire carcasses to small pieces more quickly and efficiently than previously has been possible.

It is another important advantage of the present invention that it enables machinery to be operated at a rate which is closer to the actual capacity of each machine than has been possible previously.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
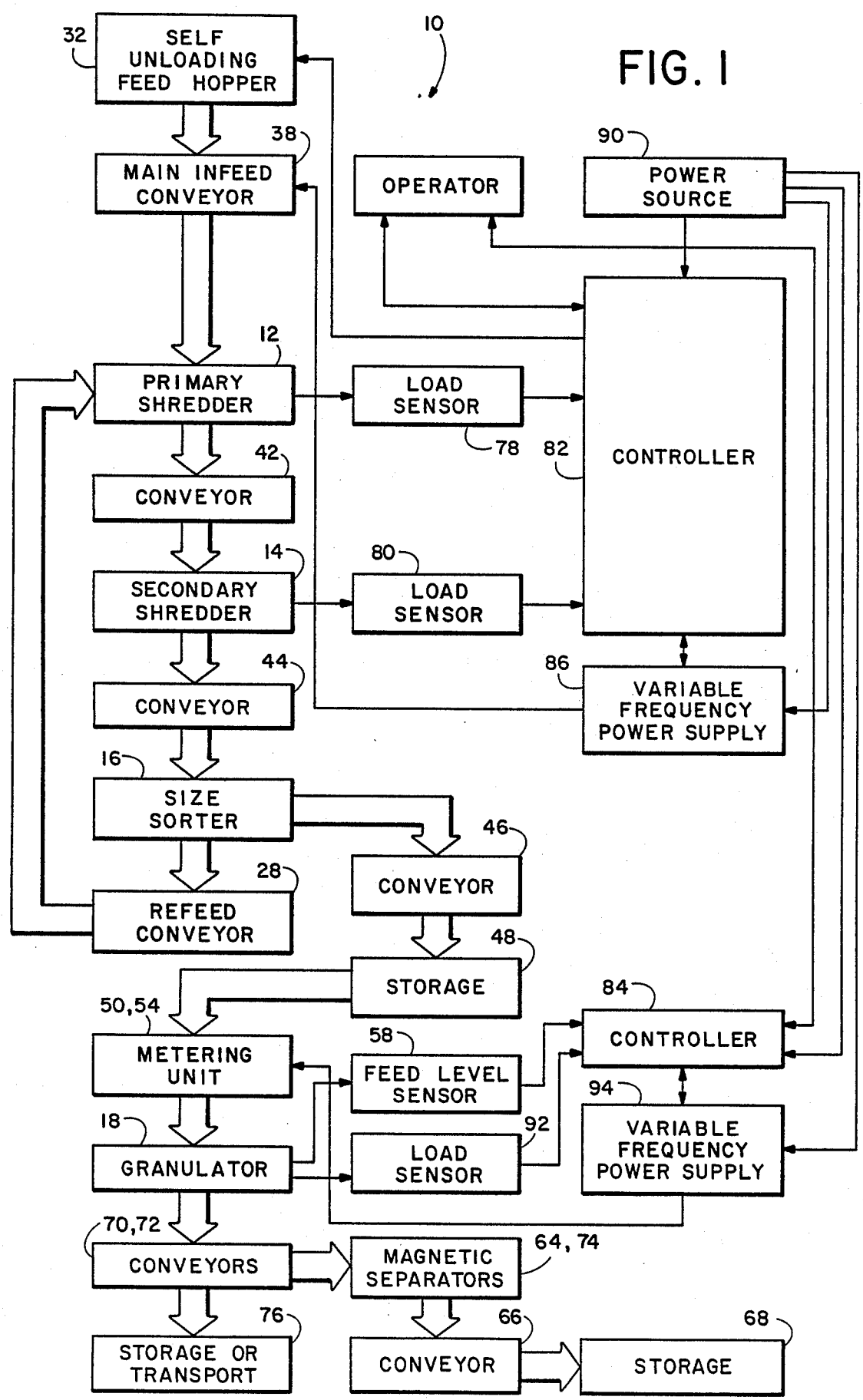
FIG. 1 is a block diagram of an arrangement of apparatus for reducing discarded pneumatic tires and similar articles of tough resilient materials into pieces of greatly reduced size, together with associated control devices, which are a preferred embodiment of the present invention.
Figure 2:
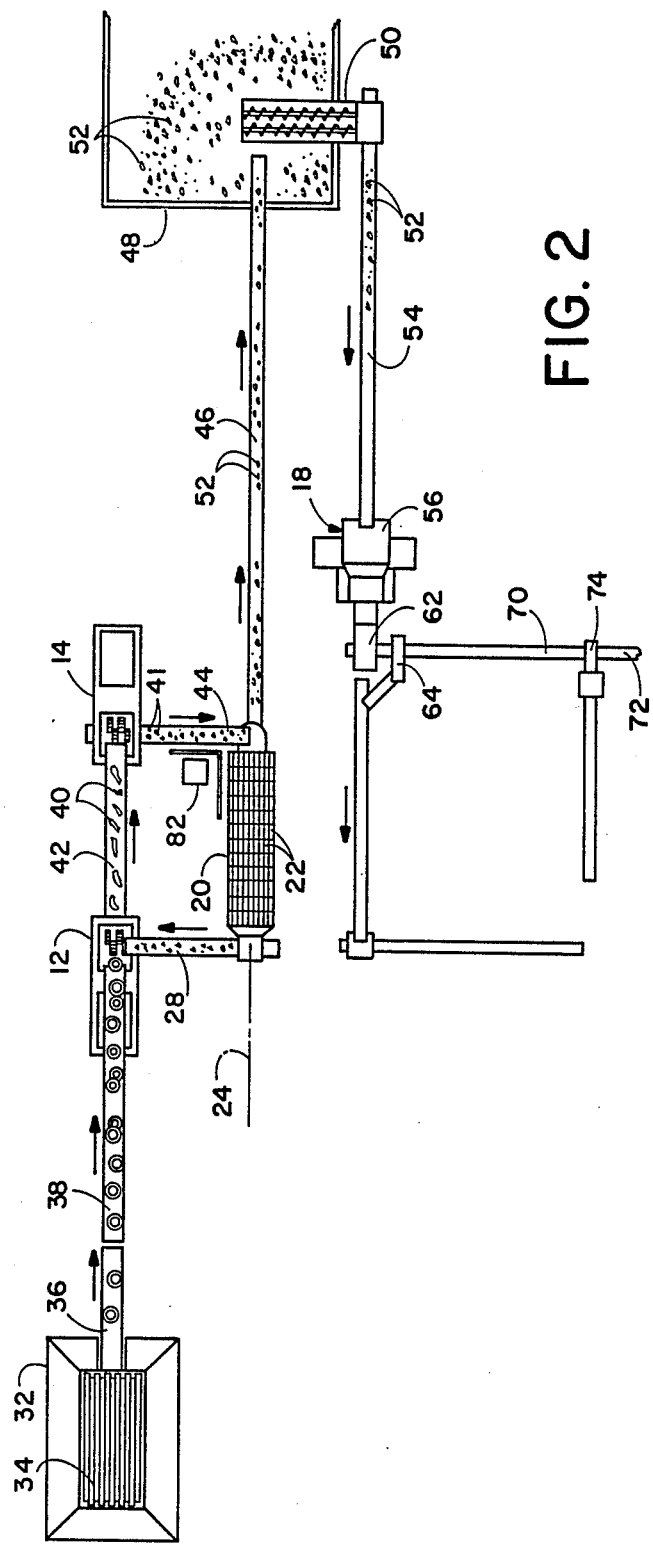
FIG. 2 is a plan view of an exemplary arrangement of the apparatus shown as a block diagram in FIG. 1.
Figure 3:
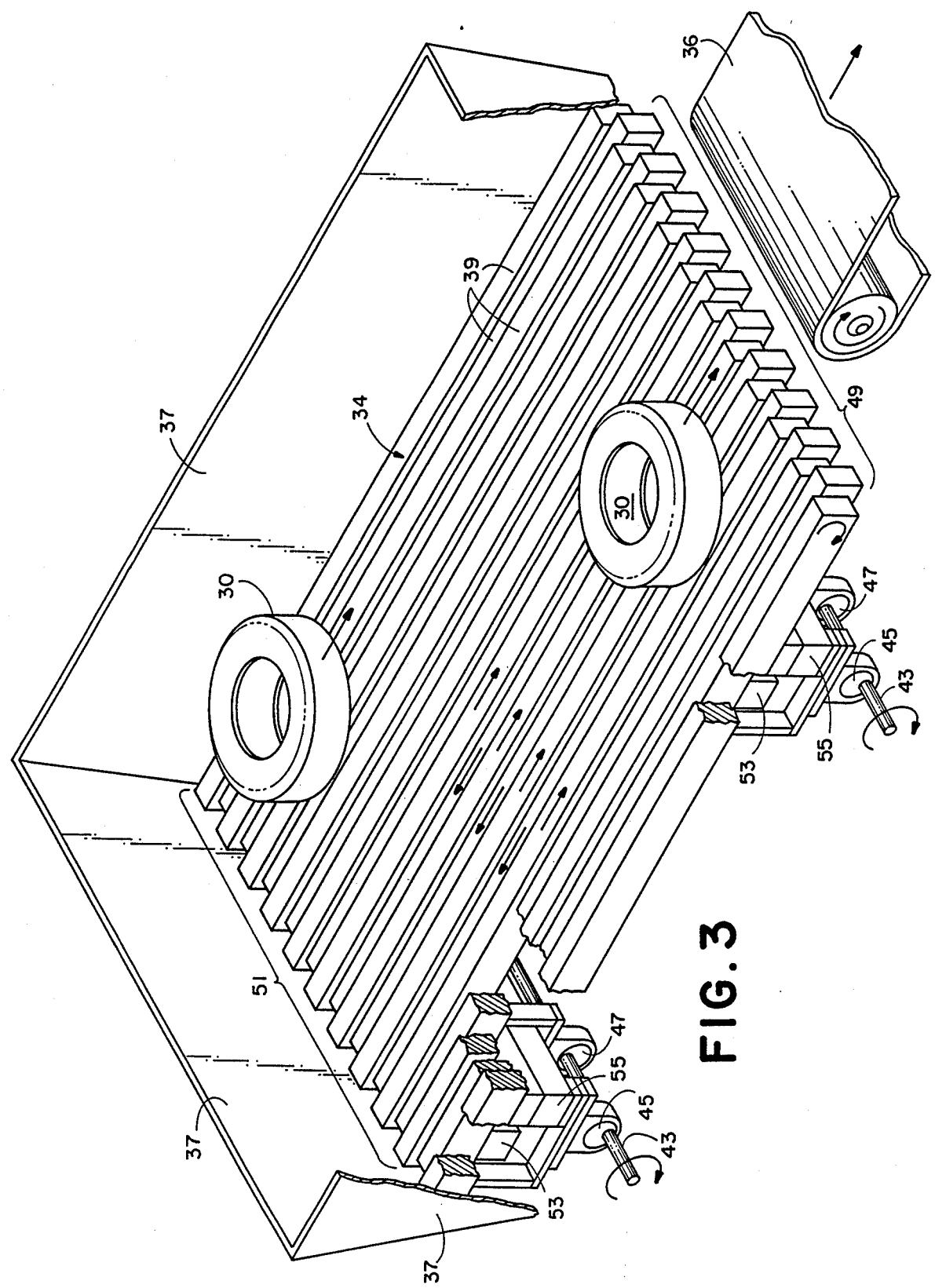
FIG. 3 is a perspective view of a self-emptying hopper used to feed articles onto a conveyor feeding the shredder apparatus according to the present invention.

Referring now to FIGS. 1-3 of the drawings, an arrangement of tire processing apparatus indicated generally by the reference numeral 10 includes a primary shredder 12 and a secondary shredder 14. Both of the primary and secondary shredders 12, 14 are preferably of the type known as rotary shear machines, and include a pair of intermeshed counter-rotating cutter rolls each incorporating a plurality of cutter disks including replaceable cutter segments defining edges which cooperate with one another as the cutter rolls rotate, shearing material into pieces. Large pieces of material will thus be cut into smaller pieces having a dimension determined in part by the thickness of one of the cutter disks of one of the intermeshed cutter rolls. A preferred machine for use as one or both of the primary shredder 12 and secondary shredder 14 is described in Rouse, et al., U.S. Pat. No. 4,560,112, whereof the disclosure is hereby incorporated herein by reference.

A size sorter 16 is used to retain large secondary pieces 41 of material discharged by the secondary shredder 14, so that they can be sent another time through both the primary shredder 12 and secondary shredder 14, while smaller, intermediate pieces 52 are placed temporarily in storage and are later fed at a controlled rate into a granulator 18, to be reduced into a greater number of pieces each no larger than a predetermined final granule size. The flow of materials is indicated in FIG. 1 by wide arrows, while control connections are indicated by single-line arrows.

Figure 8:
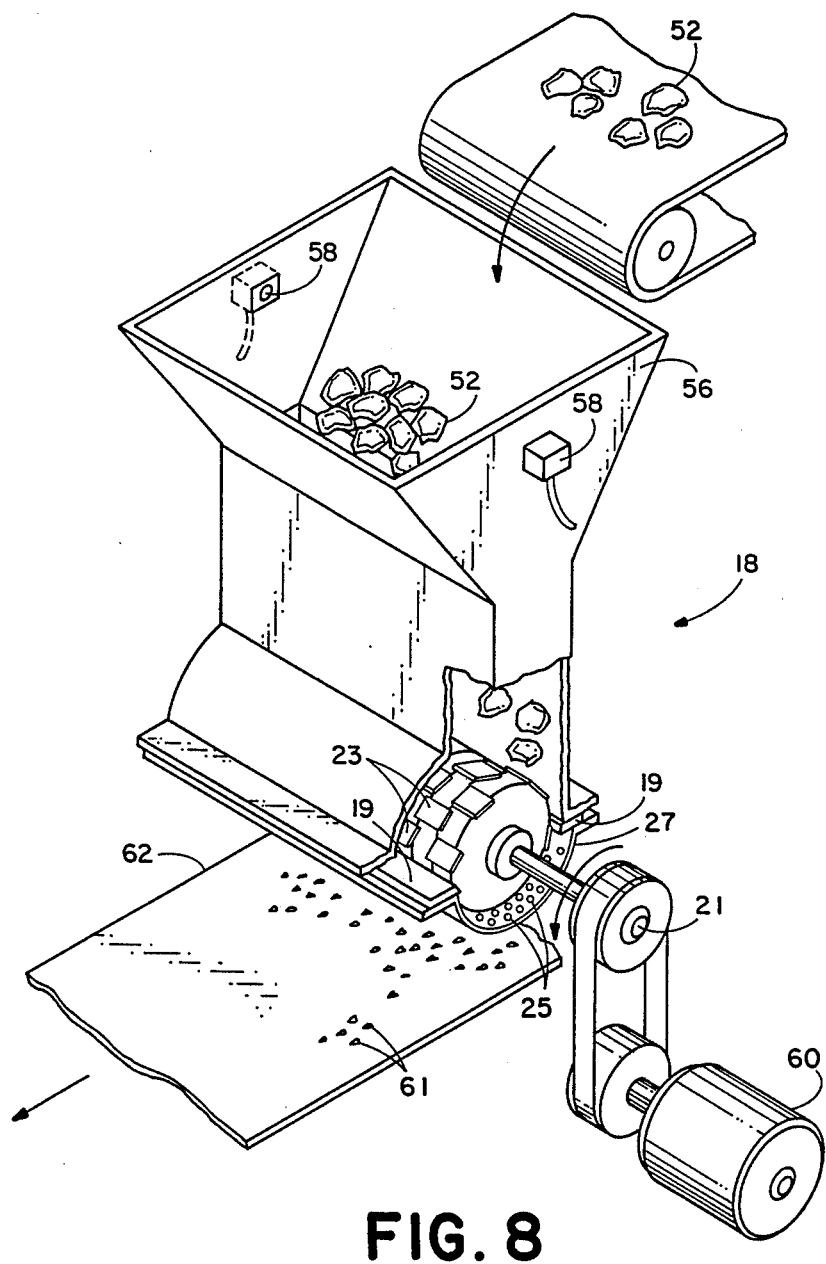
FIG. 8 is a simplified perspective view of a granulator of a type used in the combination of apparatus according to the invention.

The granulator 18, shown in greater detail in FIG. 8, is preferably of the type including a pair of stationary horizontal bed knives 19 and a rotor 21 having a plurality of short rotary knives 23 preferably carried on the rotor 21 in a staggered arrangement, but each passing within a distance of, for example, 0.005–0.020 inch of the bed knives 19 as the rotor turns, in order to shear and crush the smaller pieces of material into granules which are small enough to pass through the apertures 25 defined by a screen 27 which surrounds the lower portion of the rotor. Such apparatus is well known for use in reducing plastics materials to pieces of desired sizes for reprocessing, and an acceptable granulator for the purposes of the present invention is manufactured by Cumberland Engineering Company, a division of Leesona Corporation, of Attleboro, Mass., as its Model 3250 granulator.

The size sorter 16 may be of the rotating drum type including a rotating cylindrical screen 20 defining apertures 22 of the appropriate size. The cylindrical screen 20 is rotated about an axis 24 which is inclined with respect to the horizontal, so that material which has not fallen through the apertures 22 is carried downward and discharged from the lower end 26 into a refeed conveyor 28 which returns into the primary shredder 12 those large secondary pieces 41 which are too large to pass through the apertures 22.

Explaining the apparatus 10 in greater detail, large quantities of materials, such as tires 30 to be reduced to granules of a predetermined final size are placed into an infeed hopper 32, shown in FIGS. 2 and 3. Preferably, the infeed hopper 32 is equipped with a "walking" floor 34, which will be explained in greater detail subsequently, by means of which the infeed hopper 32 unloads itself at a controlled rate to send a regular supply of tires 30 along a conveyor 36 from the infeed hopper 32 to a main infeed conveyor 38 which leads to the primary shredder 12.

Referring now to FIG. 3, the infeed hopper 32 has a walking bottom 34 which continuously moves tires 30 toward a discharge end 35, where they are received by the conveyor 36 for transport into the primary shredder 12. Except at the portion of the discharge end 35 where the conveyor 36 is located, upstanding outwardly sloping walls 37 are provided around the walking floor 34 to retain tires 30 and the like as they are deposited by bucket loaders, for example, carrying the tires from locations such as piles where they are initially deposited after collection from sources of discarded tires or the like.

The walking bottom 34 is a pair of intermeshed decks 49 and 51, each including a set of parallel longitudinally-extending support members 39 supported from beneath by cross members 53 and 55 on which are mounted bearings rotatably carried on eccentrically bored discs 45, 47 acting as crank throws and mounted on and keyed to a pair of parallel shafts 43 extending transversely beneath the walking floor for rotation with the shafts to function as opposing throws of cranks. The shafts 43 are rotated continuously by a motor (not shown) connected to the shafts 43 by endless belt or the like, so as to have the uppermost ones of the support members 39, all of the members 39 of one of the intermeshed decks 49 and 51 moving toward the discharge end 35 at any time, while the support members 39 of the other deck, being lower than and out of phase with the higher ones, are moving rearward, in preparation for the forward-moving portion of the cycle of movement imposed by the shafts 43 and the eccentric discs 45, 47. A certain amount of reciprocal vertical motion is imparted to the tires 30, helping to avoid jamming, so that a relatively steady flow of tires 30 onto the conveyor 36 is provided.

Tires 30 passing a first time through the primary shredder 12 are sheared into primary pieces 40, or shreds, most of which have an elongate narrow strip shape, with the widths of most strips corresponding at least in part to the thickness of respective ones of the several cutter discs of the shredder 12. The primary pieces 40 of such tires, etc., which have once passed through the primary shredder 12 are discharged onto a conveyor 42 which carries them to the secondary shredder 14. Pieces of material, for convenience called secondary pieces 41, which have been shredded in the secondary shredder 14, are discharged onto a conveyor 44, which carries them upward and deposits them in an infeed hopper of the cylindrical rotating screen 20 which is the basic part of the size sorter 16.

Intermediate pieces 52 are pieces of material, no larger than a predetermined intermediate size, which fall through the apertures 22 of the screen 20 into a conveyor 46 which carries them to a temporary storage location 48. A metering unit 50 is located so as to accept the intermediate pieces 52 of material which have passed through the apertures 22 and have been conveyed therefrom to the temporary storage location 48. The metering unit 50 is a device, such as an auger-type conveyor driven by an alternating current electric motor whose speed is controlled by the frequency of the AC current powering it. The speed of the metering unit 50 is directly proportional to the AC frequency so the metering unit 50 delivers the intermediate pieces 52 from the storage location 48 at rate directly related to the speed of the metering unit 50, to a conveyor 54 which carries them to the granulator 18.

The granulator 18 includes a feed hopper 56, equipped with a feed level sensing device 58, which may be an electro-optical device, for example. The feed level sensing device 58 detects the presence of material within the feed hopper 56 above a certain level, and provides an electrical signal in response.

The granulator 18 is preferably driven at a constant speed by an alternating current electric motor 60, for example a three-phase synchronous AC motor, whose speed is directly porportional to the frequency of alternation of the current driving the motor 60.

Figure 6:
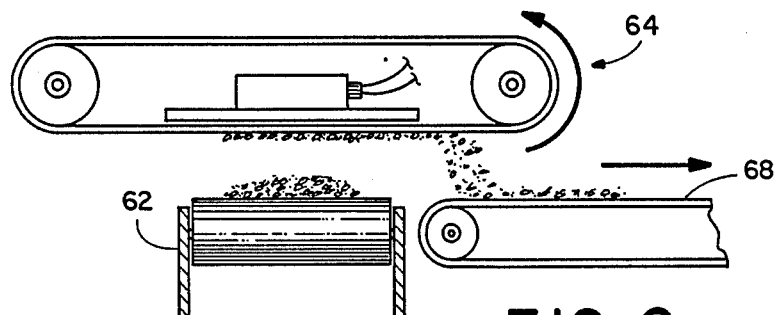
FIG. 6 is a simplified pictorial view of one type of self-cleaning magnet apparatus for removing magnetic material from materials which have been reduced to pieces of smaller size in accordance with the present invention.

Material which is fed into the granulator 18 remains within the granulator 18 until it has been reduced in size to the predetermined final granule size, for example a size able to pass through circular holes whose diameter is ¾ inch, and final size granules 61 are discharged into a vibrating pan outfeed conveyor 62. A first magnetic separator 64 is located above the outfeed conveyor 62, so as to lift magnetic materials, such as pieces of wire which had been a part of tread reinforcing belts or bead reinforcing wires and cables of tires 30. The first magnetic separator 64 is preferably a self-cleaning magnet, and may be of the type including an endless flat belt (FIG. 6) running between a magnet and the final size granules, or it may be a self-cleaning magnet of the rotating drum type (see FIG. 7). In either case, the first magnetic separator 64 removes a large portion of the magnetic materials which have been freed from the surrounding rubber, as well as some of the other reinforcing materials such as natural or synthetic fiber reinforcing cords which are often intertwined with the wires of tread reinforcing layers which have been sheared and cut apart by the shredders 12 and 14 and granulator 18.

A conveyor 66 is preferably provided to carry the magnetic materials and accompanying fiber and other materials away from the granulator 18 to a location 68 where they are accumulated for subsequent disposal.

Figure 7:
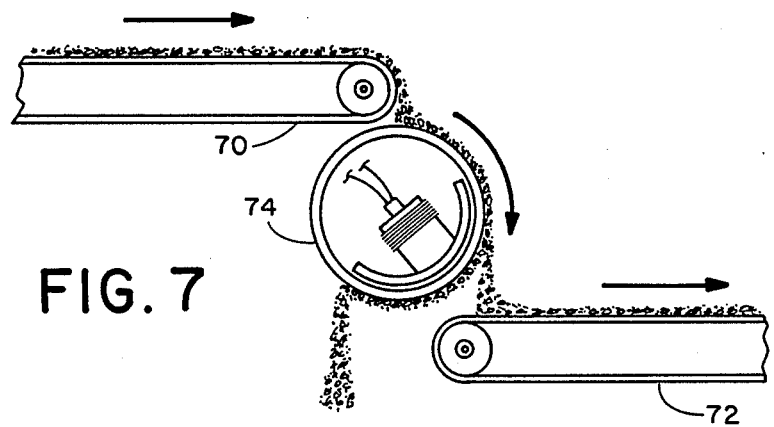
FIG. 7 is a simplified view of another self-cleaning magnet apparatus for removing magnetic material from materials which have been reduced to pieces of smaller size in accordance with the present invention.

A discharge conveyor 70 carries the remaining final size granules 61 of the tough resilient material toward a final conveyor 72, and a secondary magnetic separator 74 is located between the discharge end of the discharge conveyor 70 and the infeed end of the conveyor 72. Preferably, the secondary magnetic separator 74 is of the rotary drum self-cleaning magnet type and is located so that materials discharged from the end of the discharge conveyor 70 fall upon and are required to pass along the surface of the rotary drum of the secondary magnetic separator 74, as shown in FIG. 7. Magnetic materials are magnetically attracted to the surface of the rotary drum and adhere to it while the non-magnetic materials fall freely onto the final conveyor 72, which then carries those final size granules 61 of non-magnetic material to a final discharge location 76, where the material may be stored or placed into a vehicle.

The apparatus 10 is controlled and operated in accordance with the present invention preferably by an operator located in position to observe and control the speed of operation of the walking floor 34 of the infeed hopper 32, and the speed of the conveyors 42, 44, and 46, so as to control the load imposed upon the primary and secondary shredders 12 and 14. Preferably, load sensors 78 and 80 are associated respectively with one or both of the primary shredder and secondary shredder 12 and 14. Such load sensors may, for example, be ammeters connected to measure the amount of current drawn by electric motors driving the shredders 12 and 14, and provide electrical signals to a main controller 82. The controller 82 is preferably a suitably programmed digital electronic computer able to accept commands from the operator and to accept information from sources such as the load sensors 78 and 80. The main controller 82 is also connected to a granulator controller, or secondary controller 84, a digital computer which may be separate from or be included within the controller 82.

A variable frequency power supply 86 receives normal line AC electrical power from a power source 90 such as a commercial power connection which is also used to power the controller 82. The controller 82 may be used in response to the operator's commands to control the speed of the walking floor 34, conveyor 36, main infeed conveyor 38, and conveyors 42, 44, and 46 by altering the frequency of the AC power supplied to the electric motors of those devices by the variable frequency power supply 86, to increase or decrease the rate of delivery of tires 30 to the primary shredder 12.

Connected with the granulator 18 is a load sensor 92, preferably an ammeter measuring the current required to drive the granulator 18 and an associated analog-to-digital converter for providing a signal to the secondary controller 84. The secondary controller 84 is appropriately connected to a metering unit variable frequency power supply 94 which provides power at a controlled frequency to drive the metering unit 50 and the associated conveyor 54. The secondary controller 84 is programmed to vary the rate of delivery of intermediate pieces 52 to the granulator 18 in response to signals from the feed level sensing device 58 and load sensor 92, to maintain the load imposed on the granulator motor as close to the rated capacity of the motor as possible, for example within the range of 95-105% of the continuous load rated capacity, without permitting the feed hopper 56 to overflow.

Preferably, the size of the apertures 22 and the sizes of cutter discs in the primary and secondary shredders 12 and 14 are chosen so that the required amount of reduction of size of the intermediate pieces 52 is within the capacity of the granulator 18. Such an arrangement is to ensure that the primary and secondary shredders 12 and 14 will not be forced into idleness by backups caused by insufficient capacity of the granulator 18. On the other hand, it is to be understood that there probably will be occasional periods when the components of the system will be stopped for minor repairs of the primary and secondary shredders 12 and 14 and for ordinary preventive maintenance to be conducted on the shredders and on the granulator 18. However, the arrangement disclosed provides for a maximum capacity for processing large articles of tough resilient materials, such as tires, into final sized granules 61 appropriate for chemical processing or for further mechanical processing of the granules.

Figure 4:
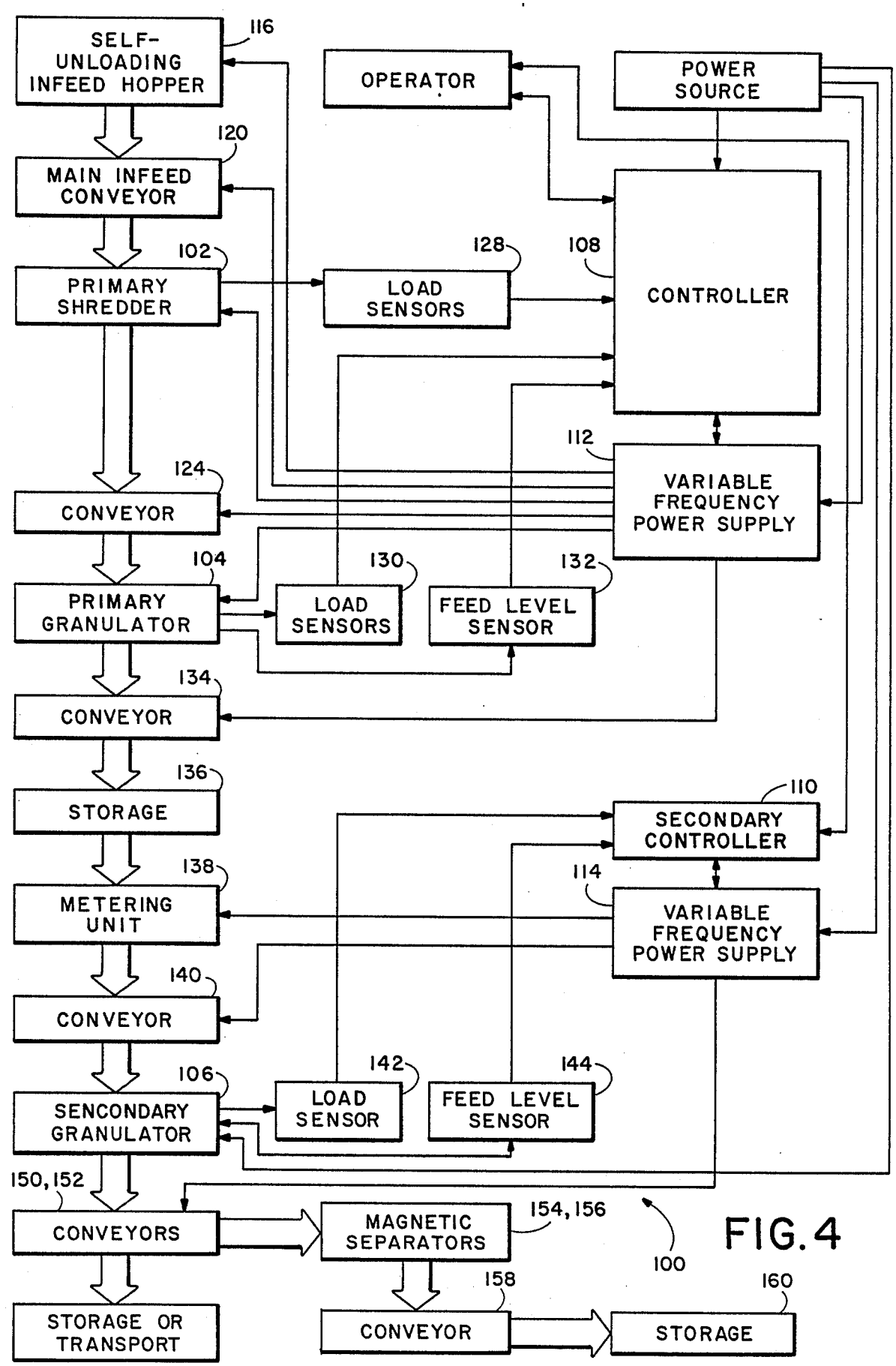
FIG. 4 is a block diagram of an arrangement of apparatus for reducing discarded pneumatic tires and similar articles of tough resilient materials into pieces of greatly reduced size, and the associated control devices, which are another embodiment of the present invention.
Figure 5:
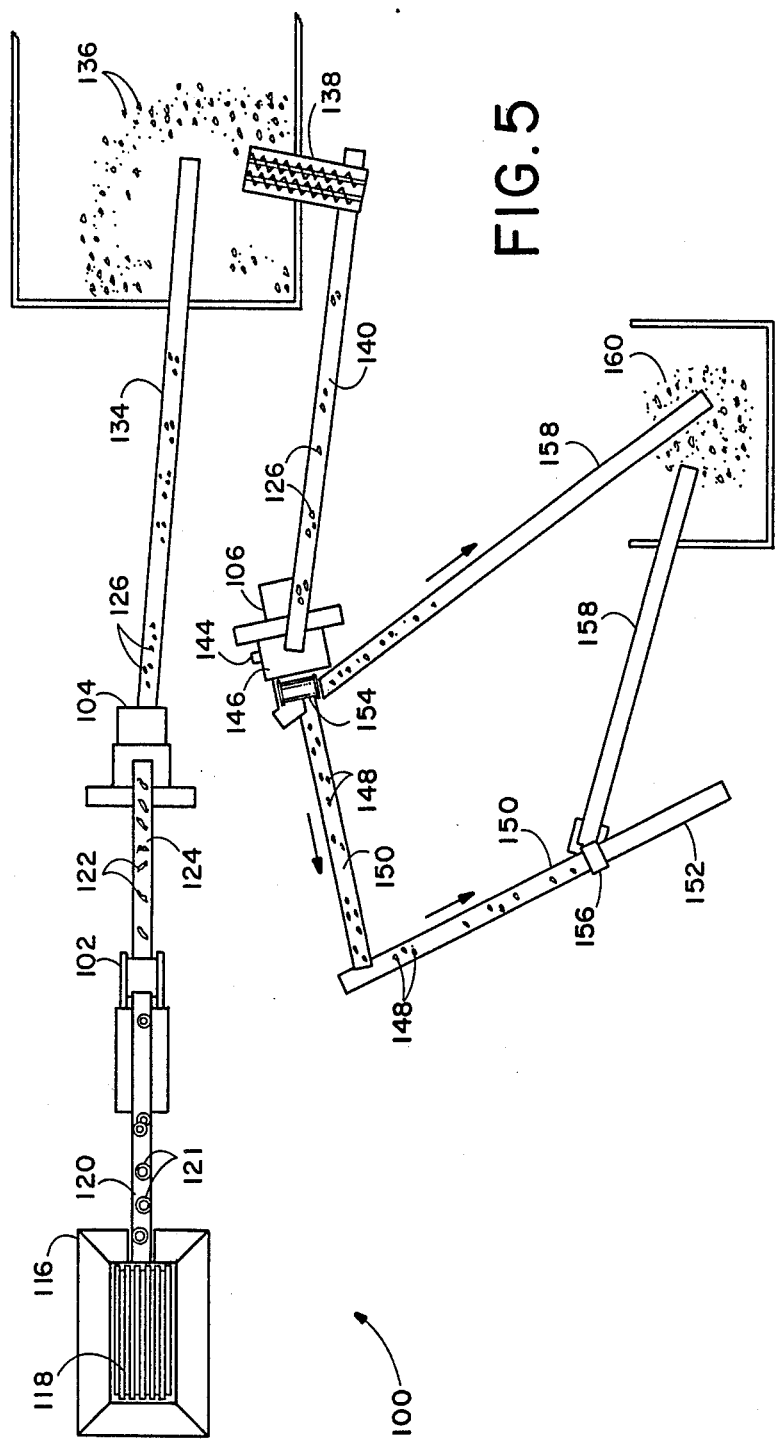
FIG. 5 is a plan view of an exemplary arrangement of the apparatus shown as a block diagram in FIG. 4.

Referring now to FIGS. 4 and 5, a system of apparatus 100 which is an alternative embodiment of the present invention includes a shredder 102, a primary granulator 104, and a secondary granulator 106. The primary shredder 102 is preferably similar to the shredders 12 and 14 described previously, and the primary and secondary granulators 104, 106 are preferably similar to the granulator 18 described previously, although the primary granulator 104 is equipped with a screen having larger apertures than those of the secondary granulator 106 or the granulator 18 of the apparatus 10. A main controller 108 and a secondary controller 110 are similar to the main controller 82 and secondary controller 84, and control, respectively, variable frequency power supply 112 and variable frequency power supply 114. As in FIG. 1, the flow of materials is indicated by wide arrows, while control signal flow and connections are indicated by single-line arrows in FIG. 4.

An infeed hopper 116 is equivalent to the infeed hopper 32 and includes a walking floor 118 whose speed is controlled by the variable frequency power supply 112. Similarly, a main infeed conveyor 120 carries large pieces of tough resilient material such as tires 121 to the primary shredder 102 at a speed which may be controlled by the variable frequency power supply 112. The shredder 102 shears the large pieces into primary pieces 122, corresponding to the primary pieces 40 produced by the primary shredder 12. Primary pieces 122 are carried by a conveyor 124 to the primary granulator 104, which is equipped with a screen having large enough apertures to permit it to accept the primary pieces 122 and reduce them into intermediate size pieces 126 at a rate comparable to the rate at which the primary shredder 102 is able to shred tires.

Preferably, load sensors 128 and 130, respectively, detect the amount of load imposed on the motors driving the primary shredder 102 and primary granulator 104 and provide appropriate electrical signals to the controller 108 in response thereto. Preferably, a feed level sensing device 132, which may be similar to the feed level sensing device 58 described previously, is provided on the primary ganulator 104 and provides an indicative signal to the controller 108, should the amount of primary pieces 122 in the infeed hopper of the primary granulator 104 become excessive.

Intermediate pieces 126 are conveyed by a conveyor 134 to a temporary storage location 136.

In accordance with the present invention the secondary granulator 106 is operated preferably at maximum safe capacity, determined by the limits of the granulator itself and the electric motor driving it. Intermediate pieces 126 are fed to the secondary granulator 106 from the temporary storage location 136 by a metering unit 138 and conveyor 140, operated at a variable speed controlled by the provision of variable frequency electric power from the variable frequency power supply 114, as controlled by the secondary controller 110, in response to signals from the load sensor 142, indicating the amount of load on the motor of the secondary granulator 106, and further in response to signals provided by a feed level sensing device 144. The feed level sensing device 144 is associated with a hopper 146 of the secondary granulator 106 to provide a signal to the secondary controller 110, should the infeed hopper 146 be filled above a predetermined maximum level. The load sensor 142 and feed level sensing device 144 may be, respectively, similar to the load sensor 80 and load level sensing device 58. Thus, the secondary controller is programmed to increase or decrease the frequency of the alternating current provided by the power supply 114 so as to keep the secondary granulator 106 operating under a load of 95–105% of the rated sustained load capacity of its motor, so long as the level of materials in the infeed hopper 146 is not too high.

Final size granules 148 are carried away from the secondary granulator 106 by conveyors 150, 152 to be stored or immediately transported. Magnetic material separators 154, 156, located similarly to the locations of the magnetic separators 64 and 74 in the apparatus 10 described above, remove magnetic material such as tread belt wires and rim bead wires from the final size granules resulting from comminution of vehicle tires. A conveyor 158 carries such magnetic materials to a storage location 160 to await transportation for further reclamation is desired.

Using the apparatus 10 or 100 according to the present invention, passenger vehicle and truck tires may be reduced to pieces having maximum dimensions of one inch or less at a rate of several thousand tires per day.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for reducing large pieces of tough, resilient materials such as rubber vehicle tires, some of said large pieces including magnetic reinforcing structures, into smaller pieces, comprising:
    (a) shearing said large pieces of material in a primary rotary shear apparatus of the type having cooperative counter-rotating cutter rolls, thereby reducing said large pieces into primary pieces at least some of which are elongate;
    (b) passing said primary pieces including said elongate pieces through a secondary rotary shear mechanism of the type including cooperative counter-rotating cutter rolls to further reduce the size of primary pieces of material and produce secondary pieces;
    (c) sorting from the secondary pieces which have passed through both the primary and secondary rotary shear machines intermediate pieces which are smaller than a predetermined maximum size and secondary pieces which are larger than said predetermined maximum size;
    (d) repeating steps (a), (b), and (c) with respect to said secondary pieces which are larger than said predetermined maximum size;
    (e) placing said intermediate pieces which are smaller than said predetermined maximum size in a temporary storage location;
    (f) removing some of said intermediate pieces from said temporary storage location at a controlled rate;
    (g) granulating said intermediate pieces and reducing the size thereof in a granulator, to produce granulated materials having a predetermined smaller final granule size, at the maximum rate at which said granulator can be operated continuously;
    (h) magnetically lifting loose pieces of magnetic material from among said granulated materials;
    (i) thereafter moving the remaining granulated materials over a self-cleaning magnet magnetically attracting and removing additional magnetic material from said remaining granulated materials;
    (j) permitting non-magnetic portions of said granulated materials to fall free from said self-cleaning magnet; and
    (k) thereafter conveying said non-magnetic portions of said granulated materials to a discharge location.

2. The method of claim 1, further including the steps of driving said primary rotary shear apparatus electrically, measuring the electrical load drawn by said first shredder, and conveying whole large pieces of material to said first shredder at a rate controlled in response to the electrical load of said first shredder.

3. The method of claim 1, including measuring the amount of power required to granulate said pieces of material and adjusting the rate at which material is removed from temporary storage and deliverd to said granulator, in response to the amount of power being used in granulating said pieces, so as to load said granulator substantially continuously to a maximum capacity at which said granulator is designed to operate continuously.

4. The method of claim 3 including removing said pieces from temporary storage by apparatus driven by an alternating current electric motor, and controlling the rate of said removal by varying the frequency of alternating current electrical power provided to said motor.

5. A method for reducing large pieces of tough, resilient materials, such as pneumatic tire casings including reinforcing wire, into smaller pieces, comprising:
    (a) shredding said large pieces of material in a rotary shear apparatus of the type having counter-rotating cutter rolls, to reduce said large pieces into primary pieces;
    (b) reducing the size of said primary pieces by passing said primary pieces through a first granulator, producing intermediate pieces no larger than a predetermined intermediate size;
    (c) thereafter delivering said intermediate pieces of material to a second granulator;
    (d) passing said intermediate pieces of material through a second granulator and producing therefrom within said second granulator final size granules of material of a predetermined final size which is smaller than said predetermined intermediate size;

(e) measuring the amount of power being used by said second granulator during step (d); and (f) controlling the rate at which said intermeditate pieces of material are delivered to said second granulator in response to the amount of power used by said secondary granulator.

6. The method of claim 5, including the further step of magnetically lifting a quantity of magnetic material from among the final size granules of material, and conveying the remainder of said final size granules of material to a predetermined location.

7. The method of claim 5, including the further step of magnetically attracting and holding additional pieces of magnetic material and removing them from said final size granules of material, and permitting said final size granules to fall away from said additional pieces of magnetic materials.

8. The method of claim 6, including the step of removing additional magnetic material from said final size granules of material by passing said final size granules over a self-cleaning magnet of the revolving drum type and permitting non-magnetic portions of said materials to fall away from said drum while magnetic materials are retained magnetically on the surface of said drum.

* * * * *

UNITED STATES PATENT AND TRADEMARK OFFICE
CERTIFICATE OF CORRECTION

PATENT NO. : 4,714,201

DATED : December 22, 1987

INVENTOR(S) : Michael W. Rouse et al.

It is certified that error appears in the above-identified patent and that said Letters Patent is hereby corrected as shown below:

Col. 6, line 32     After "at" insert --a--

Col. 9, line 38     Change "is" to --as--

Col. 11, line 5     Change "intermeditate" to --intermediate--

Signed and Sealed this

Twenty-second Day of November, 1988

Attest:

DONALD J. QUIGG

*Attesting Officer*     *Commissioner of Patents and Trademarks*